May 6, 1924.

J. A. NORDIN

MEAT SLICING MACHINE

Filed Sept. 15, 1923

1,492,741

Inventor
J. A. Nordin
By Marks & Clerk Attys.

Patented May 6, 1924.

1,492,741

UNITED STATES PATENT OFFICE.

JOSEF AUGUST NORDIN, OF STOCKHOLM, SWEDEN, ASSIGNOR TO AKTIEBOLAGET STILLE-WERNER, OF STOCKHOLM, SWEDEN, A CORPORATION OF SWEDEN.

MEAT-SLICING MACHINE.

Application filed September 15, 1923. Serial No. 662,968.

*To all whom it may concern:*

Be it known that I, JOSEF AUGUST NORDIN, a subject of the King of Sweden, residing at Gotgatan 14, Stockholm, Sweden, have invented certain new and useful Improvements in Meat-Slicing Machines, of which the following is a specification.

Holding devices for the meat or the like hitherto used in meat slicing machines have a drawback, consisting in the impossibility of cutting meat of a comparatively soft consistency to a point located close to that part of the meat piece, at which it is held in the machine, because the slices cut from the said piece then easily are deformed or destroyed. The object of this invention is to remove the said disadvantage and thus to render possible the cutting of unobjectionable slices even from meat of the said kind, until there is only a very slight part of the piece uncut.

The invention is described below compared with holding devices of the type hitherto used.

Figure 1:
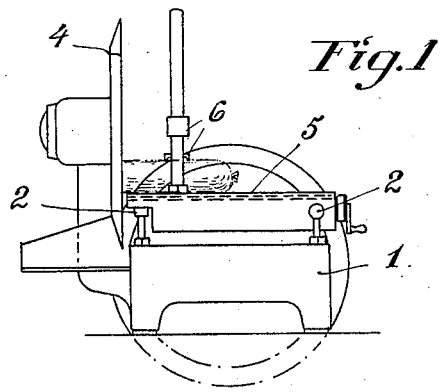
Figure 2:
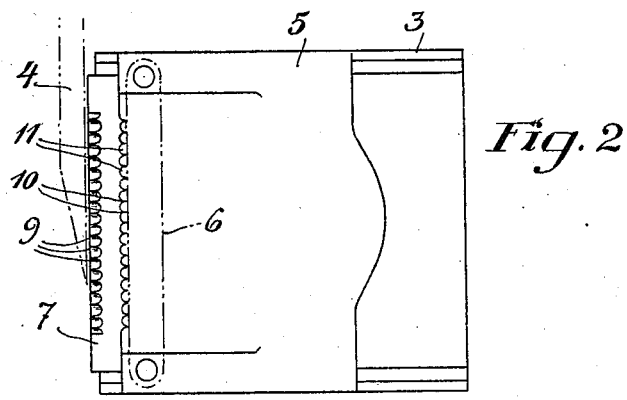
Figure 3:
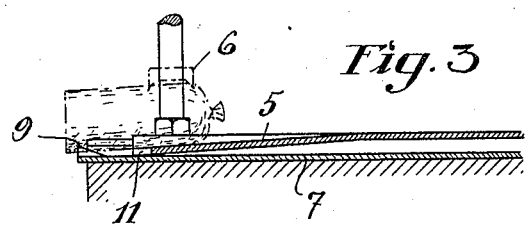
Figure 4:
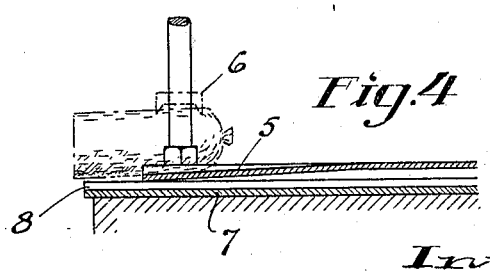

In the accompanying drawing Fig. 1 is an end view of a slicing machine of the general type. Figs. 2 and 3 are a plan view and a cross section respectively of a holding device arranged in accordance with this invention. Fig. 4 shows in a cross section a holding device of the known type.

1 is the frame of the machine, provided with the guides 2, on which the slide 3 is reciprocated in front of the knife 4. The table 5 together with the meat holder 6 is slidable on the slide 3 and fed toward the knife 4 in the well known manner. To the slide 3 below the table 5 a cover plate 7 is fixed, which in meat slicing machines of the construction hitherto known is provided with grooves 8, Fig. 4, extending longitudinally of its whole length. The object of the ridges located between the said grooves is to support the meat and hold the same in the proper position, while moved past the knife 4. Owing to its rotary motion the knife 4 forces the meat against the said ridges. The supporting of the meat in the said manner is necessary especially when the meat (for instance consisting of sausages of liver) has a soft consistency. If the support of the meat effected by the ridges ceases, the pressure exerted by the knife will bend the meat toward the side, the slice being thereby deformed. This occurs in the known holding devices even when the holder 6 is at a comparatively great distance from the knife, due to the fact that the table 5 slides on the ridges, in consequence whereof the meat $a$, in spite of its somewhat slanting position, does not touch the ridges, see Fig. 4.

According to the present invention on the other hand the cover plate 7 is plane, Figs. 2 and 3, and only at the front edge of the plate short projections, teeth 9 or the like are located, which extend above the top surface of the plate. Owing to this arrangement the table 5 or a part of the same may be lowered, so that the meat is supported by the teeth 9, even when there is only a short part of the meat uncut, see Fig. 3. Recesses 10, corresponding to teeth 9, are provided in the front edge of the table 5 in such manner, that the tongues 11, located between the said recesses 10, can enter into the spaces located between the teeth 9. Owing to this arrangement the front edge of the table 5 may be brought substantially to the front edge of the bar without being prevented by the teeth 9.

I claim:

1. A meat-slicing machine, in which the table carrying the meat is fed in a direction perpendicular to the cutting plane and on a supporting plate or cover plate, characterized by the provision of meat supporting projections on the cover plate, the top surface of which latter is substantially plane, the said projections being provided only at the edge of the plate, which is located nearest to the cutting plane.

2. A device according to claim 1, characterized by the front edge of the table, located nearest to the cutting plane, being provided with recesses, so located, that the tongues located between the said recesses can enter into the spaces located between the projections, as the table approaches its end position.

In testimony whereof I have affixed my signature in presence of two witnesses.

JOSEF AUGUST NORDIN.

Witnesses:
 ROBERT APELGREN,
 L. BERGO LINDE.